(12) United States Patent
Liu et al.

(10) Patent No.: US 6,229,700 B1
(45) Date of Patent: May 8, 2001

(54) PORTABLE COMPUTER HOST WITHOUT ANY USER INTERFACE

(75) Inventors: Louis Liu; Grace Chang, both of Taipei Hsien (TW)

(73) Assignee: Saint Song Corp., Taipei (TW)

( * ) Notice: Subject to any disclaimer, the term of this patent is extended or adjusted under 35 U.S.C. 154(b) by 0 days.

(21) Appl. No.: 09/374,979

(22) Filed: Aug. 16, 1999

(51) Int. Cl.⁷ .................................................. H05K 7/20
(52) U.S. Cl. ......................... 361/687; 361/692; 361/695
(58) Field of Search .................................. 361/687, 692, 361/695, 699, 688, 694, 698, 700, 1, 702, 725, 727

(56) References Cited

U.S. PATENT DOCUMENTS

| | | | |
|---|---|---|---|
| 5,805,417 | * 9/1998 | Nakagawa et al. | 361/687 |
| 6,043,977 | * 3/2000 | Nakajima | 361/687 |
| 6,058,009 | * 5/2000 | Hood, III et al. | 361/687 |
| 6,061,237 | * 6/2000 | Sands et al. | 361/695 |

* cited by examiner

Primary Examiner—Leo P. Picard
Assistant Examiner—Hung Van Duong
(74) Attorney, Agent, or Firm—Kinney & Lange, P.A.

(57) ABSTRACT

A portable computer host without any user interface is disclosed. The disclosed portable computer host includes the elements below. First, a mother board is provided, a CPU is placed on the upper surface of the mother board and electrically coupled to the mother board via cables. A main memory is placed on the lower surface of the mother board and electrically coupled to the CPU via cables. Via a socket, the CPU is coupled to the mother board. Additionally, a heat sink is attached to the CPU to dissipate the heat generated by the CPU. At least one port is placed along the periphery of the mother board. Via the connecting ports, user interfaces can be connected to the portable computer. The disclosed portable computer host also includes a housing, consisting of s lower case and an upper case. Among these, the lower case holds the mother board and encapsulates the lower surface. Besides, the upper case covers the upper surface of the mother board. Additionally, the upper case has a plurality of air inlets and at least one exhaust outlet. By coupling the upper case to the lower case, the mother board and the above elements are sealed.

20 Claims, 4 Drawing Sheets

PORTABLE COMPUTER HOST WITHOUT ANY USER INTERFACE

BACKGROUND OF THE INVENTION

1. Field of the Invention

The present invention relates to a computer host, and more particularly to a portable computer host without any user interface.

2. Description of the Prior Art

The approaches of modern technologies bring computer size smaller than before. Nowadays, although desktop PCs and portable computer such as notebook computers or handhold PCs can be respectively employed as a still host or a movable host, one fatal disadvantage remains on all the currently used computers. Please refer to FIG.1(a) and FIG.1(b), which depicts perspective views of a desktop PC 10 and a notebook computer 20, respectively. As known by the skilled persons, the desktop PC 10 is unsuitable for frequently moving because of volume and weight. On the other hand, the notebook computer 20 usually has 3-5 kilograms because user interface such as LCD 12 and keyboard 14 must be standard equipment. Accordingly, a bottleneck evidently appears at degrading the notebook size because the sizes of the aforementioned user interface can not be infinitely reduced. For example, users may feel uncomfortable at visual when looking at a LCD 12 with too small size. Furthermore, it is not so convenient for use when a keyboard 14 composed of buttons having size smaller than a human's finger.

A summary about the above description is made as below. For the traditional personal computer, even the notebook computer, the interface between the user and the computer, such as the monitor and the keyboard, occupies too much volume. However, contradiction is that further reducing the volume of the interface between the user and the computer is not a proper solution because of inconvenience operations.

SUMMARY OF THE INVENTION

The present invention discloses a portable computer host without any user interface. The portable computer host includes a mother board, a CPU, an auxiliary memory, a main memory, at least one port and a housing. Among these, the mother board has an upper surface and a lower surface. The CPU is placed on the upper surface and electrically coupled to the mother board via cables. The auxiliary memory is placed on the upper surface and electrically coupled to the mother board via the cables. The main memory is placed on the lower surface and electrically coupled to the CPU via the cables. Via a socket, the CPU is coupled to the upper surface of the mother board. Additionally, a heat sink is attached to the CPU to dissipate the heat generated by the CPU. At least one connecting port is placed along the peripheries of the mother board. Via the connecting ports, user interfaces such as a monitor and a keyboard can be connected to the disclosed portable computer.

The housing consists of a lower case and an upper case. Among these, the lower case holds the mother board and encapsulates the lower surface. The upper case covers the upper surface of the mother board. Additionally, the upper case has a plurality of air inlets and at least one exhaust outlet. The air inlets of the upper case serve as the intake of fresh air. Via the air inlets, the fresh air is introduced into the CPU by the fan. Then, via the exhaust outlet, the heat generated by the CPU is exhausted. Accordingly, the problem caused by the heat generated by the CPU is solved. By coupling the upper case to the lower case, the mother board and the above elements are sealed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Compared to the traditional notebook computer, the present invention possesses higher portable ability. The portable computer host disclosed by the present invention is used in a position and what the user has to do is to pre-prepare for additional user interface, such as monitors and keyboards. Therefore, the user does not have to force himself to use the monitor and the keyboard violating human engineering.

Figure 1:
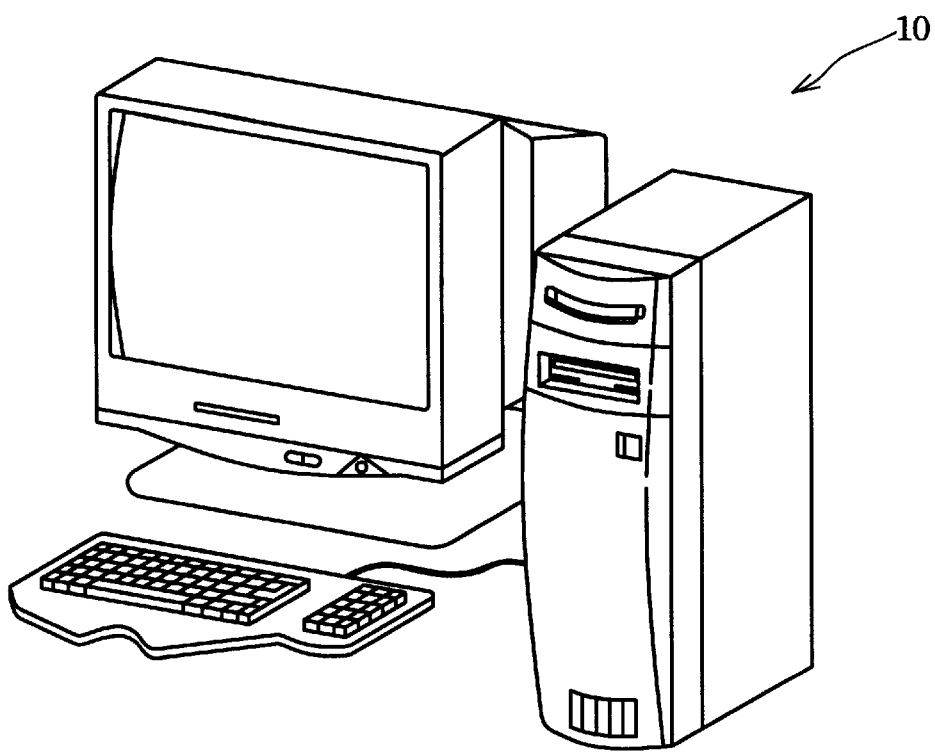
FIG. 1(a) depicts the outline of a traditional desktop personal computer.
FIG. 1(b) depicts the outline of a traditional notebook computer.
Figure 1:
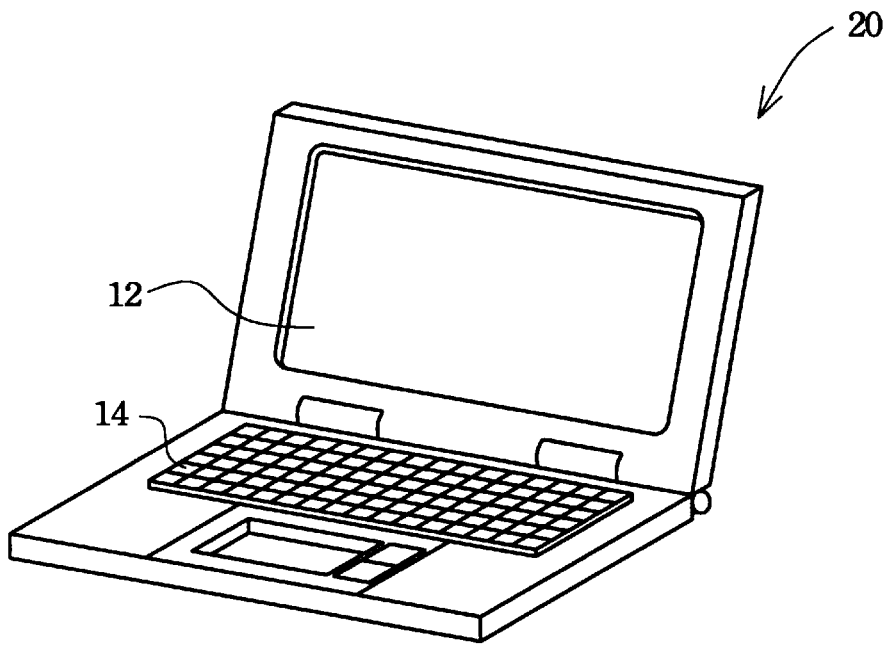
Figure 2:
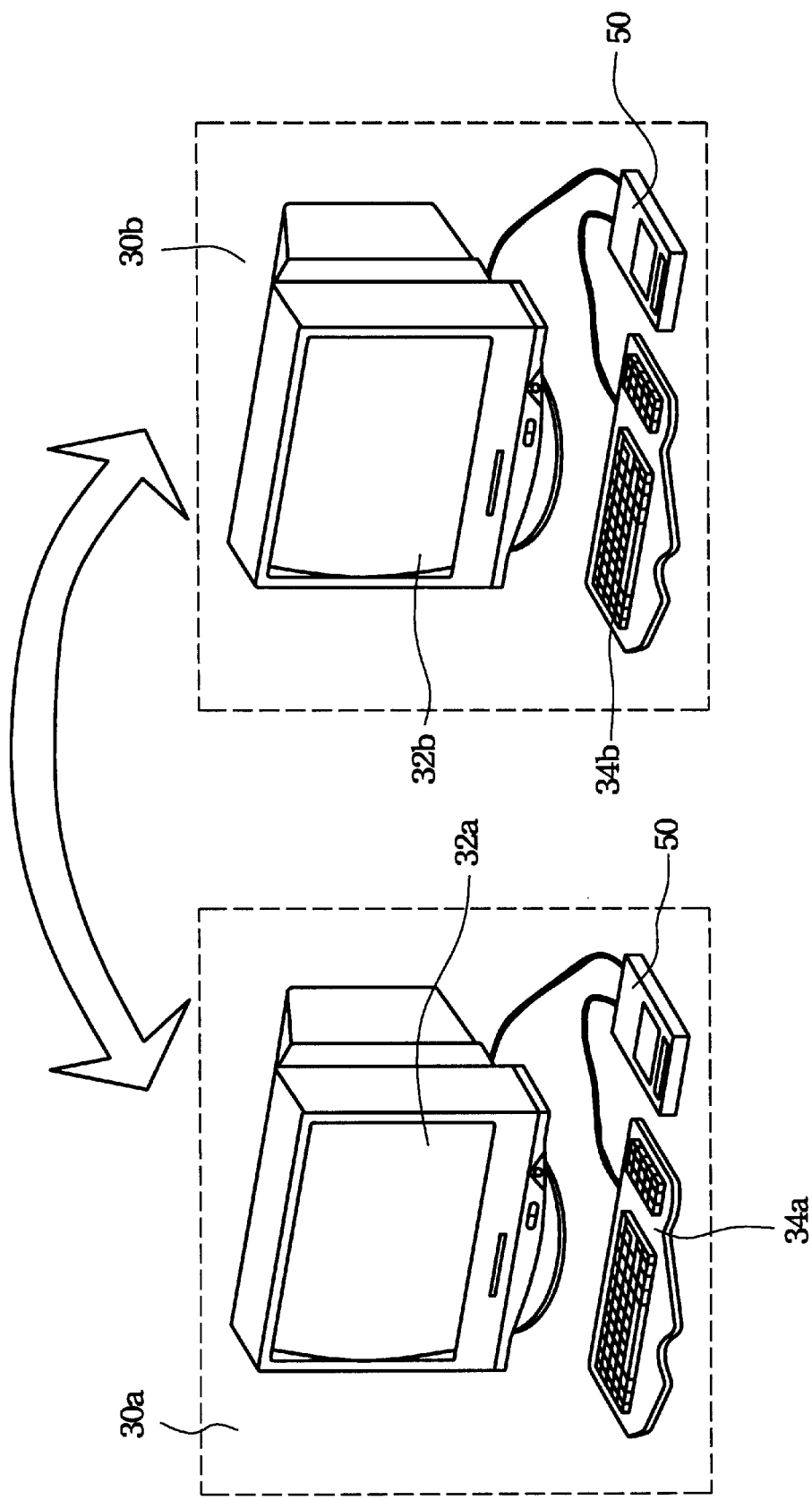
FIG. 2 depicts a schematic diagram illustrative of when a disclosed portable computer host used between different positions.

Although a user can carry a notebook computer any time, however, almost people start to work after arriving at destinations instead of working during traveling. For the users above, the computer carried by them is burdensome due to its monitor and keyboard, even though the computer is a notebook computer. Therefore, the portable computer host does not include any monitor and keyboard in order to reduce the volume. The idea of the present invention is depicted by FIG. 2 and described as follows, wherein a user moves from a first position 30a to a second position 30b. During his move, the user carries the disclosed portable computer host 50 rather than a conventional computer, such as a notebook computer. The portable computer host 50 does not include any monitor and a keyboard so that the volume and the weight can be apparently reduced. As a result, the user feels as if relieved of a heavy load. Of course, at the second position, the user must prepare a second monitor 32b and a second keyboard 34b for serving as the user interface between the user and the host. As noted, a first monitor 32a and a first keyboard 34a used in first position are different with the second monitor 32b and the second keyboard 34b. The additionally prepared second monitor 32b and the second keyboard 34b will not be a heavily economical burden on users because these devices are inexpensive today.

Figure 3:
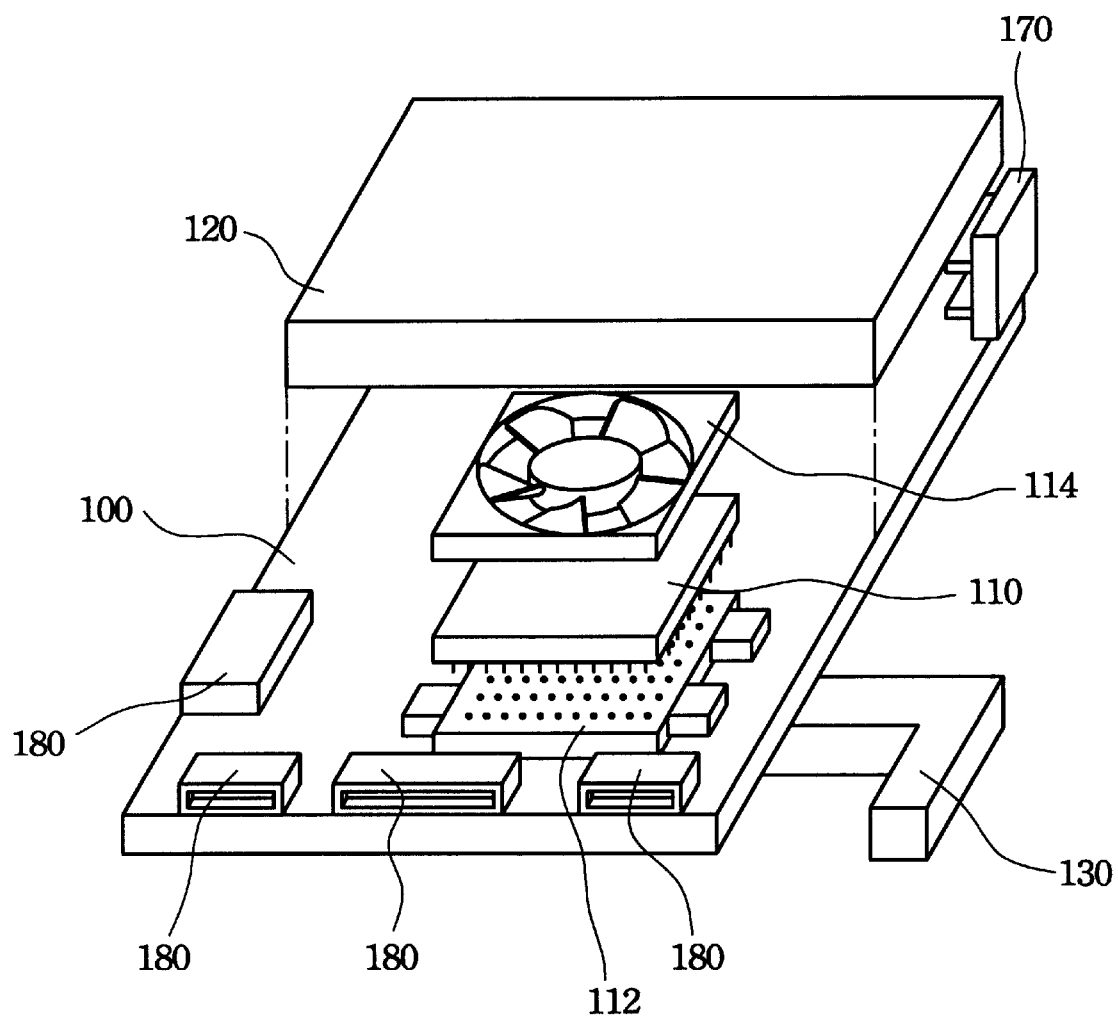
FIG. 3 is an exploded diagram illustrating portions of the elements consisting of the present invention.

Referring to FIG. 3, the portable computer host according to the present invention includes a mother board 100, a central processing unit (CPU) 110, an auxiliary memory 120, a main memory 130, at least one port 180 and a housing. Among these, the mother board 100 has an upper surface and a lower surface. Both of the upper surface and the lower surface can connect other devices by using cables (not shown). For example, a CPU 110 is placed on the upper surface and electrically coupled to the mother board 100 via the cables. An auxiliary memory 120 is placed on the upper surface and electrically coupled to the CPU via an auxiliary circuit board 170. Alternatively, the auxiliary memory 120 is electrically coupled to the CPU via the cables. In the preferred embodiment, a hard disk driver is selected as the auxiliary memory 120. A main memory 130 is placed on the lower surface and electrically coupled to the CPU 110 via the cables. Note that the functions of the above-mentioned elements are identical to the traditional elements so that the detail descriptions of the functions are omitted.

Still referring to FIG. 3, via a socket 112, the CPU 110 is coupled to the mother board 100. Additionally, a heat sink 114 is attached to the CPU 110 to dissipate the heat generated by the CPU 110. In a preferred embodiment, a fan is selected to serve as the heat sink. At least one connecting port 180 is placed as the periphery along the edges of the mother board 100. Besides, the connecting port 180 and the CPU are on the same side of the mother board 100. The connecting ports 180 can be composed of a USB port, a video port, a PS/2 port, extending ports and a power connector. By connecting a monitor and a keyboard to the portable computer host via the connecting port 180, a computer having complete function is available. Besides, via the connecting port 180, it is available to expand the functions of the portable computer host. For example, via the connecting port 180, a cursor control device can be electrically coupled to the portable computer. The cursor control device includes a mouse, a track ball, a mini joystick, a track pad and a touch pad. Alternatively, via the connecting port 180, a floppy disk driver can be electrically coupled to the portable computer. Furthermore, via the connecting port 180, a CD-ROM can be electrically coupled to the portable computer. It is important to note that the size and the specification of the above elements are the same with that of general or traditional elements. Thus, the cost and the assembly do not burden the portable computer.

Figure 4:
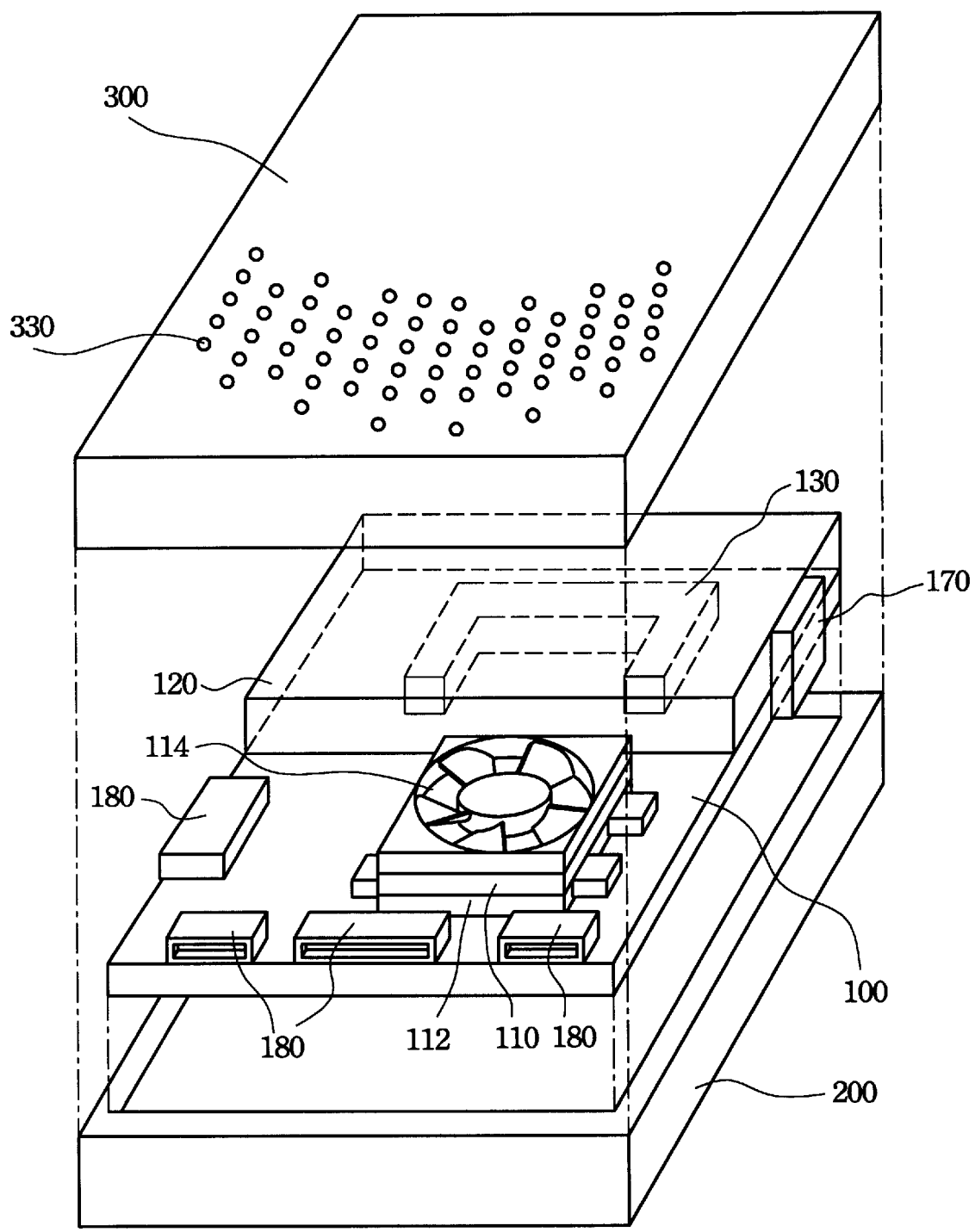
FIG. 4 is an exploded diagram illustrating whole elements consisting of the present invention.

Referring to FIG. 4, the present invention also includes a lower case 200 and an upper case 300. Among these, the lower case 200 is used to hold the mother board 100 and encapsulate the lower surface. The upper case 300 is used to cover the upper surface of the mother board 100. Additionally, the upper case 300 has a plurality of air inlets 330 and at least one exhaust outlet (not shown). The air inlets 330 of the upper case 300 serve as the intake of fresh air. To describe it in detail, via the air inlets 330, the fresh air can be introduced into the CPU 110 by the fan 114. Then, via the exhaust outlet, the heat generated by the CPU 110 is exhausted. Accordingly, the problem caused by the heat generated by the CPU 110 is overcome. In the preferred embodiment, the exhaust outlet is formed on the sidewall of the upper case 300. By coupling the upper case 300 to the lower case 200, the mother board 100 and the above elements are sealed. In this preferred embodiment, the length, the width and the thickness of the portable computer host are 15 cm, 10 cm and 3 cm, respectively. According to the size above, the portable computer host indeed possesses higher portable ability compared to traditional computers. However, it is important to note that the person skilled in the art can amend the aforementioned length, the aforementioned width and the aforementioned height according to the spirit of the present invention.

After the portable computer host is brought from a first position to a second position, a computer with user interfaces can be obtained by connecting the computer host to a monitor and a keyboard. Because the disclosed computer host is identical, it is not necessary to backup data by an assistant storage device.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A portable computer host having dimensions substantially smaller than dimensions of a computer host of a desktop personal computer, said portable computer host comprising:

a mother board;

a CPU (central processing unit), said CPU being coupled to said mother board;

an auxiliary memory, being allocated on said mother board, said auxiliary memory being electrically coupled to said CPU;

a main memory, being allocated on said mother board, said main memory being electrically coupled to said CPU;

at least one connecting port, allocated on said mother board and electrically coupled to said CPU, for coupling to an user interface, wherein the user interface is made according to specifications for a desktop personal computer; and a housing for encapsulating said mother board, said CPU, said auxiliary memory, said main memory and exposing portions of said connecting port, wherein said portable computer host has no user interface.

2. The portable computer host according to claim 1, wherein said CPU is coupled to an upper surface of said mother board via a socket.

3. The portable computer host according to claim 1, further comprising a heat sink, said heat sink being attached to said CPU to dissipate heat generated by said CPU.

4. The portable computer host according to claim 3, wherein said heat sink comprises a fan.

5. The portable computer host according to claim 1, wherein said auxiliary memory comprises a hard disk driver.

6. The portable computer host according to claim 1, wherein said auxiliary memory is electrically coupled to said CPU via an auxiliary circuit board.

7. The portable computer host according to claim 1, wherein said main memory is coupled on a lower surface of said mother board.

8. The portable computer host according to claim 1, wherein said user interface comprises a monitor and a keyboard.

9. The portable computer host according to claim 1, wherein said periphery device comprises a cursor control device, a floppy disk driver and a CD-ROM.

10. The portable computer host according to claim 1, wherein said housing comprises:

a lower case, said lower case being used to hold said mother board; and an upper case, said upper surface being used to cover said upper surface, by coupling said lower case to said upper case, said mother board, said CPU, said main memory being sealed but said port being exposed.

11. The portable computer host according to claim 1, wherein an upper case of the housing has a plurality of air inlets and at least one exhaust outlet, via the air inlets, fresh air being introduced to the CPU, via the exhaust outlet, heat generated by the CPU being exhausted.

12. A portable computer host having dimensions substantially smaller than dimensions of a computer host of a desktop personal computer, said portable computer host comprising:
- a mother board, said mother board having an upper surface and a lower surface;
- a CPU (central processing unit), being coupled to said upper surface of said mother board;
- an auxiliary memory, being allocated on said upper surface of said mother board, said auxiliary memory being electrically coupled to said CPU;
- a main memory, being allocated on said lower surface of said mother board, said main memory being electrically coupled to said CPU;
- at least one connecting port, allocated on said upper surface of said mother board and electrically coupled to said CPU, for coupling to a user interface, wherein the user interface is made according to specifications for a desktop personal computer; and
- a heat sink, being attached to said CPU to dissipate heat generated by said CPU;
- a lower case for holding said mother board and covering said lower surface; and
- an upper case for covering said mother board and said upper surface, said upper case having a plurality of air inlets and at least one exhaust outlet, via said air inlets, air being introduced to said CPU, via said exhaust outlet, heat generated by said CPU being exhausted, by coupling said lower case to said upper case, said mother board, said CPU, said main memory being sealed and said port being exposed, wherein said portable computer host has no user interface.

13. The portable computer host according to claim 12, wherein said CPU is coupled to said upper surface of said mother board via a socket.

14. The portable computer host according to claim 12, wherein said heat sink comprises a fan.

15. The portable computer host according to claim 12, wherein said auxiliary memory is electrically coupled to said CPU via an auxiliary circuit board.

16. The portable computer host according to claim 12, wherein said user interface comprises a monitor and a keyboard.

17. The portable computer host according to claim 12, wherein said periphery device comprises a cursor control device, a floppy disk driver and a CD-ROM.

18. A portable computer host having dimensions substantially smaller than dimensions of a computer host of a desktop personal computer, the portable computer host comprising:
- a mother board;
- a CPU (central processing unit), the CPU being coupled to the mother board;
- an auxiliary memory, being allocated on the mother board, the auxiliary memory being electrically coupled to the CPU;
- a main memory, being allocated on the mother board, the main memory being electrically coupled to the CPU;
- at least one connecting port, allocated on the mother board and electrically coupled to the CPU, for coupling to an user interface, wherein the user interface is made according to specifications for a desktop personal computer; and
- a housing for encapsulating the mother board, the CPU, the auxiliary memory, the main memory and exposing portions of the connecting port.

19. The portable computer host according to claim 18, further comprising a fan adjacent to the CPU for heat dissipation.

20. The portable computer host according to claim 18, wherein the housing comprises an upper case having a plurality of air inlets on the CPU.

* * * * *